US009440803B1

(12) United States Patent
Martin et al.

(10) Patent No.: US 9,440,803 B1
(45) Date of Patent: Sep. 13, 2016

(54) DUST BIN INDICATOR SYSTEM

(71) Applicant: Willis Hochstetler, Jr., Nappanee, IN (US)

(72) Inventors: Mervin Martin, Wakarusa, IN (US); Curtis Martin, Nappanee, IN (US)

(*) Notice: Subject to any disclaimer, the term of this patent is extended or adjusted under 35 U.S.C. 154(b) by 0 days.

(21) Appl. No.: 14/793,049

(22) Filed: Jul. 7, 2015

(51) Int. Cl.
B65G 51/08 (2006.01)
B65G 53/66 (2006.01)
B65G 43/08 (2006.01)
B65G 69/06 (2006.01)
B65G 53/16 (2006.01)
B65G 67/20 (2006.01)
B65D 88/54 (2006.01)

(52) U.S. Cl.
CPC ............. *B65G 53/66* (2013.01); *B65D 88/548* (2013.01); *B65G 43/08* (2013.01); *B65G 53/16* (2013.01); *B65G 67/20* (2013.01); *B65G 69/06* (2013.01)

(58) Field of Classification Search
CPC ...... B65G 53/66; B65G 53/16; B65G 67/20; B65G 69/06; B65G 43/08; B65D 88/548
USPC .................................................. 406/10, 106
See application file for complete search history.

(56) References Cited

U.S. PATENT DOCUMENTS

| 2,814,531 | A | * | 11/1957 | Murray, Jr. | ............ | B65G 53/06 406/106 |
| 2,898,158 | A | * | 8/1959 | Pollock | .................. | B65G 53/64 406/32 |
| 4,765,779 | A | * | 8/1988 | Organ | .................... | B65G 53/30 141/1 |
| 8,514,090 | B2 | | 8/2013 | Witter et al. | | |

* cited by examiner

Primary Examiner — William R Harp
(74) Attorney, Agent, or Firm — Botkin & Hall, LLP

(57) ABSTRACT

An indicator system is provided for use with a blown-in dust transfer system. A dust collector collects dust, where it accumulates at an airlock feeder. When the feeder moves, accumulated dust is dispensed into an introduction chamber. A blower moves air through an introduction chamber where the dust particles become entrained in the moving air. The dust and air mixture are moved into a removable storage container where the dust particles fall out of the moving air. Return air that is mostly devoid of dust returns to the introduction chamber. Between the storage container and the introduction chamber is a sensor that detects dust in the return air. If the level of dust reaches a certain amount the sensor detects it and an operator is notified that the storage container is full.

15 Claims, 5 Drawing Sheets

DUST BIN INDICATOR SYSTEM

BACKGROUND OF THE INVENTION

In sawmill, woodworking, or other related industries, sawdust is a natural byproduct that must be dealt with on a regular basis. Sawdust is typically vacuumed out and sent to a dust collector, where it is stored until it can be hauled away. Once the level of sawdust reaches a threshold, it is emptied, typically into a trailer or other mobile storage device. Because sawdust is relatively lightweight and would easily blow out when the trailer is transported, an open top trailer is undesirable. Additionally, in order to load an open top trailer, the dust collector must be raised off of the ground far enough to allow the trailer to drive underneath, creating additional expense and difficulty in servicing. Trailers in the art are enclosed with rear doors that have two holes cut through them. One hole receives the sawdust and the other is for return air that is displaced from the trailer as the sawdust is loaded. Currently, no system exists that controls the dispensing of sawdust, and the process must be manually monitored to prevent the trailer from becoming overfilled, thereby overwhelming the feeding system. The user relies on a visual observation of the dust that is present in the return line or physically stopping the system to observe directly the amount of dust in the trailer. Relying on watching dust presence in the return line is subjective and subject to error based on environmental conditions and buildup in a transparent portion of the return line. When the process is not watched, an inadvertent user could not stop the process in time, overfilling the trailer and filling all of the tubing with sawdust, creating a downtime and possible equipment damage. Disassembling and clearing out the system after it is packed with dust is time consuming and difficult, idling production and adding unnecessary expense. Further, stopping and starting the process for periodic inspection is time consuming, wasteful, and creates premature wear and tear on the equipment. An improved system is needed.

SUMMARY OF THE INVENTION

The present disclosure describes a closed loop system that indicates when the trailer has reached a predetermined fill level. A feeder and airlock located at the bottom of a dust collector dispenses a controlled amount of sawdust into a stream of air that is moved by a blower. The stream of air passes underneath the dispensed controlled amount of sawdust, where falling sawdust becomes mixed and suspended in the stream of air. The stream of air with entrained sawdust is blown into a trailer, where the sawdust falls to the trailer's floor. The air returns back to the feeder, passing a density sensor, where more sawdust is added by the feeder. As the trailer fills with sawdust, the amount of dust in the return air increases. When the sensor detects a predetermined density of sawdust in the return air, the system alerts the user that the trailer is at capacity. Further, an optional control system is integrated with the sensor and automatically controls the blower and feeder.

BRIEF DESCRIPTION OF THE DRAWINGS

A preferred embodiment of this invention has been chosen wherein.

DESCRIPTION OF THE PREFERRED EMBODIMENT

Figure 1:
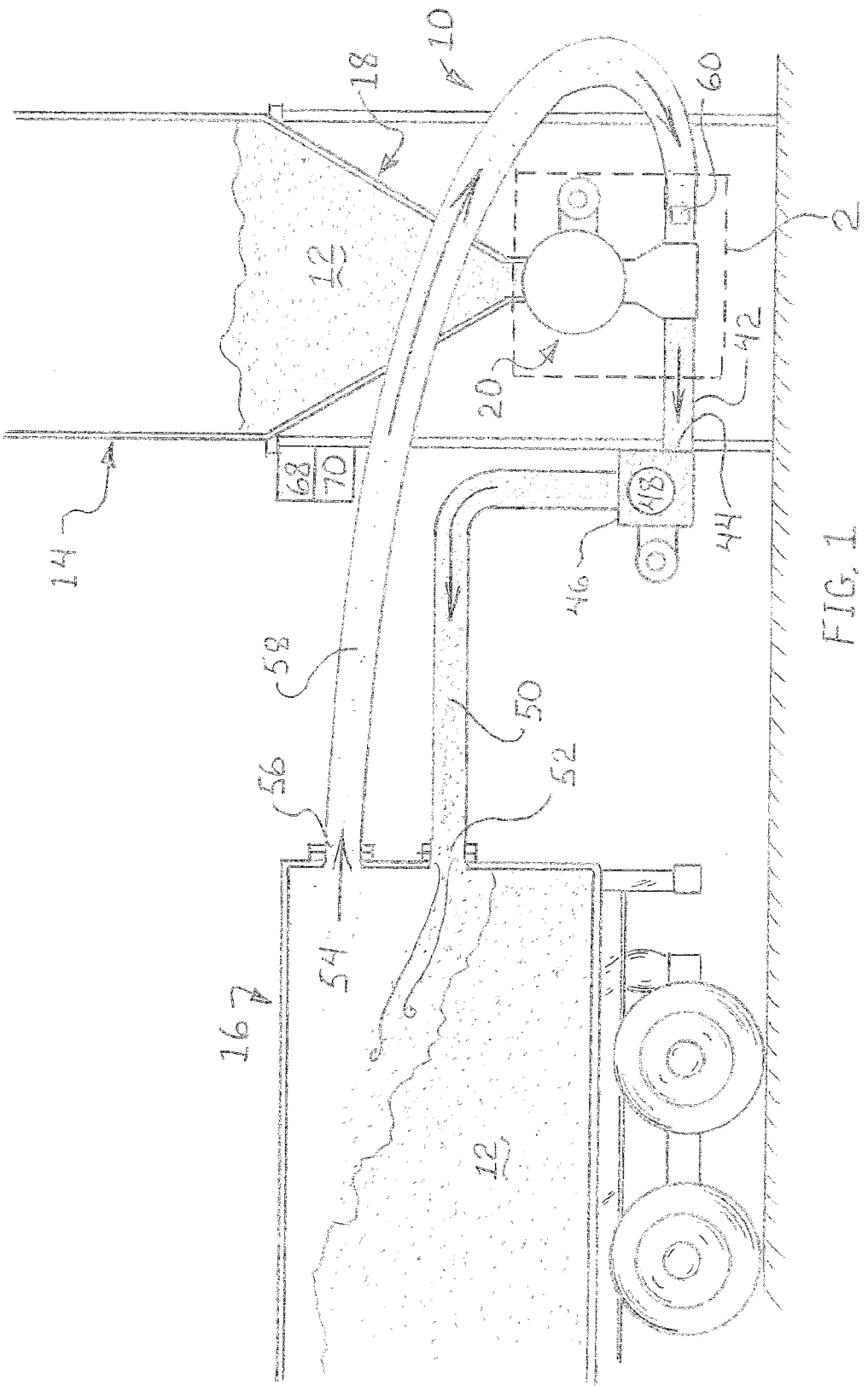
FIG. 1 is an overall side view of the system.

A dust bin indicator system 10 as shown in FIG. 1 collects dust 12 or other bulk particulate byproduct from a dust collector 14 and moves it into a storage and transportation container, such as a trailer 16. The dust collector 14 collects dust 12 from an external source, such as sanders, grinders, or other process equipment, where it accumulates in a tapered lower portion 18. The dust collector 14 can only fill to a certain point before it becomes ineffective or damaged, so regular emptying is necessary. Dust collectors 14 are known in the art and commonly have a tapered lower portion 18 where dust 12 or other accumulated material can be emptied. The tapered lower portion 18 is typically conical but can be pyramidal. Dust 12 collects at the lowest point. At the bottom of the lower portion 18 is a device for metering the dust 12, typically called a rotary feeder 20. The rotary feeder 20 also serves as an air lock. The purpose of the rotary feeder 20 is to prevent all of the dust 12 present in the lower portion 18 from travelling into an introduction chamber 30. Another purpose of the rotary feeder 20 is to prevent airflow present in the dust collector 14 from exchanging with airflow that may be present in the introduction chamber 30. The rotary feeder 20 has an inlet side 22 and an outlet side 24 with a metering device such as an auger 26 located between the two. The auger 26 is typically rotated by a motor 25 to dispense the dust 12 from the inlet 22 to the outlet 24. It is contemplated that other metering devices are used, such as a screw-type auger, moving chamber, or a trap door. It is further contemplated that the auger 26 is driven through other means, such as hydraulics.

Figure 2:
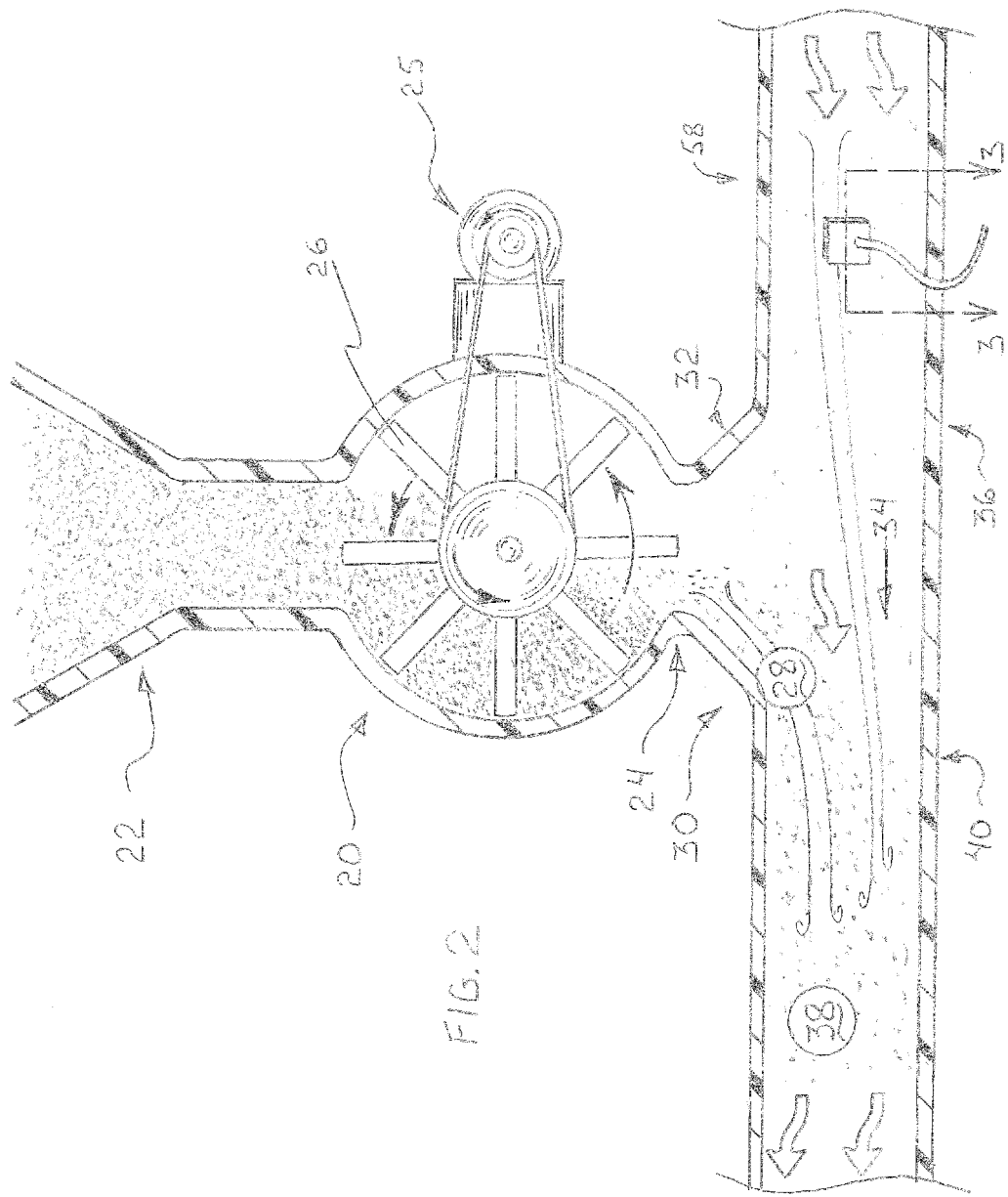
FIG. 2 is a partial view 2 of the system in FIG. 1.

As shown in FIG. 2, the outlet side 24 of the rotary feeder 20 dispenses a metered amount of dust 28 into the top of the introduction chamber 30 at a dust inlet 32. The introduction chamber 30 introduces the metered amount of dust 28 into a stream of moving air 34. The stream of moving air 34 moves across the introduction chamber 30 with the dust inlet 32 being located directly above. The metered amount of dust 28 falls directly into the stream of moving air 34. The stream of moving air 34 moves from the air inlet 36 and mixes with the metered amount of dust 28 to form a dust/air mixture 38 that exits the outlet 40. In the dust/air mixture 38, dust particles are entrained with the stream of moving air and remain suspended as long as the moving air 34 is moving sufficiently.

The dust/air mixture 38 then proceeds down a pipe 42 toward the inlet 44 of a blower 48. The blower 48 draws air in through the inlet 44 using negative pressure and drives it out of an outlet 46 with positive pressure. The blower 48, as shown, drives the dust/air mixture 38 from the outlet 48 to a supply line 50. The supply line 50 transfers the dust/air mixture 38 into an inlet 52 on the trailer 16. The trailer 16 is moveable with the supply line 50 being able to disconnect in order to relocate the trailer 16. The pressurized dust/air mixture 38 enters the cavity of the trailer 16, where the dust 12 falls out of the moving air and settles as shown in FIG. 1. Because the trailer 16 is closed from escaping air, return air 54 that is mostly free of dust exits an outlet 56 and then moves into a return line 58. Like the supply line 50 being able to disconnect, the return line 58 is able to disconnect to allow the trailer to be moved. Because the blower 48 is pulling air from the introduction chamber 30, and the rotary feeder 20 does not allow significant air flow through it, the air is pulled through the return line 58, creating a loop of circulating air. This closed loop is visible in FIGS. 1 and 5. The closed loop prevents any dust 12 that remains present in the return air 54 from escaping.

Figure 3:
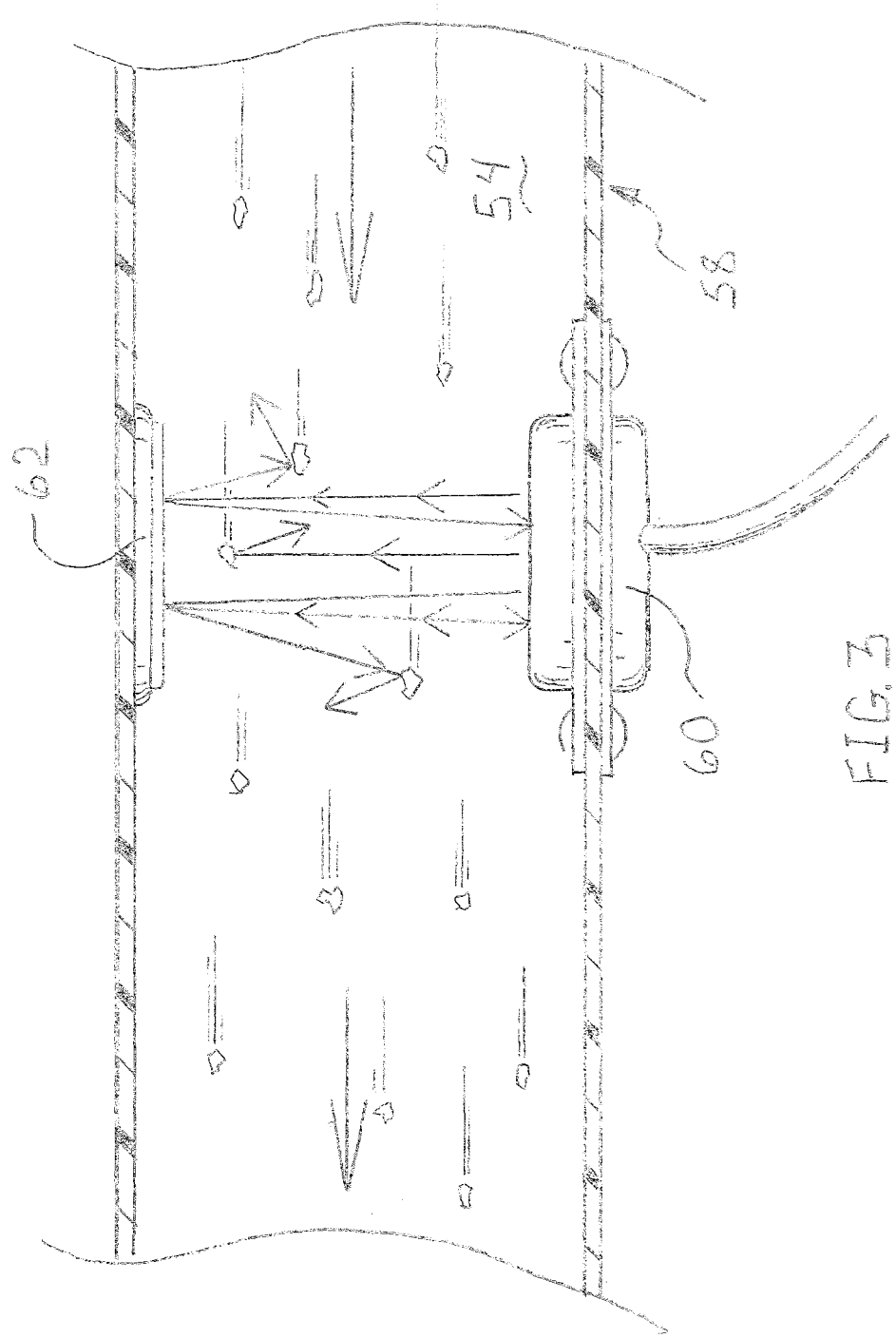
FIG. 3 is a section view 3-3 of the return line in FIG. 2.

The return air 54 moves through the return line 58, where it then passes a density sensor 60 as shown in FIGS. 1-3 and 5. The density sensor 60 as shown is a retroreflective. A retroreflective sensor works by sending out a beam of light, reflecting it off of a certain type of reflector, and then received to determine if the beam is blocked. As shown in FIG. 3, a portion of the sensor 60 sends out a light beam, where it bounces off of a reflector 62 and is then received by another portion. The reflector 62 is usually placed opposite the sensor 60 with the return air 54 passing directly between the two. The sensor 60 then calculates the difference in the intensity of the light as sent to the intensity of the light as received. It is contemplated that another sensor type is used such as a through beam (where there is a transmitter on one side and a receiver on the other side). If a through beam sensor is utilized, the reflector 62 would be replaced with a transmitter and the density sensor 60 would be a receiver only. Other sensors that detect the dust density in the return air 54 are contemplated, such as capacitive or ultrasonic. It is further contemplated that a reflective sensor is utilized that reflects off of dust 12 in the dust/air mixture 38 to detect the density of the return air 54.

The sensor 60 as shown is located in the return line 58, but could be located in the introduction chamber 30, as long as it is located before the metered amount of dust 28 is mixed into the stream of moving air 34. The sensor 60 is shown in the return line 58 in close proximity to the introduction chamber 30 but could be located anywhere in the return line 58.

Further an additional sensor (not shown) could be located in the supply line 50, the pipe 42, or the blower 48 to detect the density of dust 12 as it is introduced into the system 10. The additional sensor could alert the user that the dust collector 14 is empty or the feeder 20 is not properly functioning. Additional sensors are further contemplated to allow better control over the system 10 and improve the user's monitoring capabilities.

Figure 5:
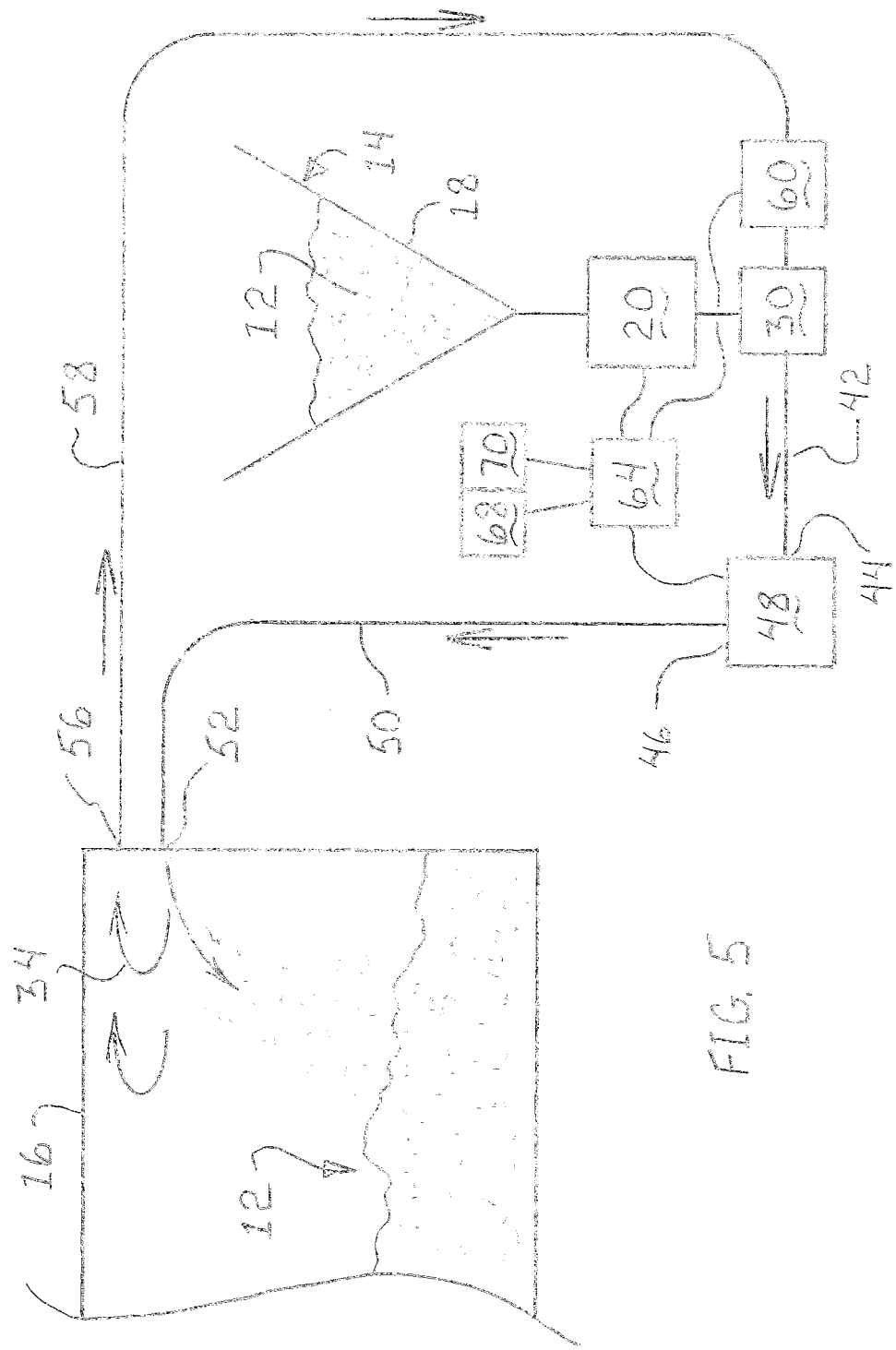
FIG. 5 is a block diagram of the control system.

A control system 64, as shown in FIG. 5, receives the signal from the density sensor 60 and indicates its output to the user. The control system 64 alerts the user with a visual indicator, such as a strobe light or a sound such as a bell or siren. The user then decides to turn off the blower 48 and/or the rotary feeder 20. It is further contemplated that the control system 64 directly controls the blower 48 and rotary feeder 20. In the event that the control system 64 directly controls the blower 48 and rotary feeder 20, the rotary feeder 20 would be disabled to stop the flow of the metered amount of dust 28 from entering the introduction chamber 30, then the blower 48 would be disabled to stop the flow of air. At that point, the user would be alerted through indicator lights 68, a siren 70, or both. The user would be safe to disconnect the supply line 50 and the return line 58 and move the trailer 16. Any additional sensors could be utilized to allow the control system 64 to cycle the rotary feeder 20 on and off to better control the amount of dust 12 as it is dispensed into the introduction chamber 30.

Figure 4:
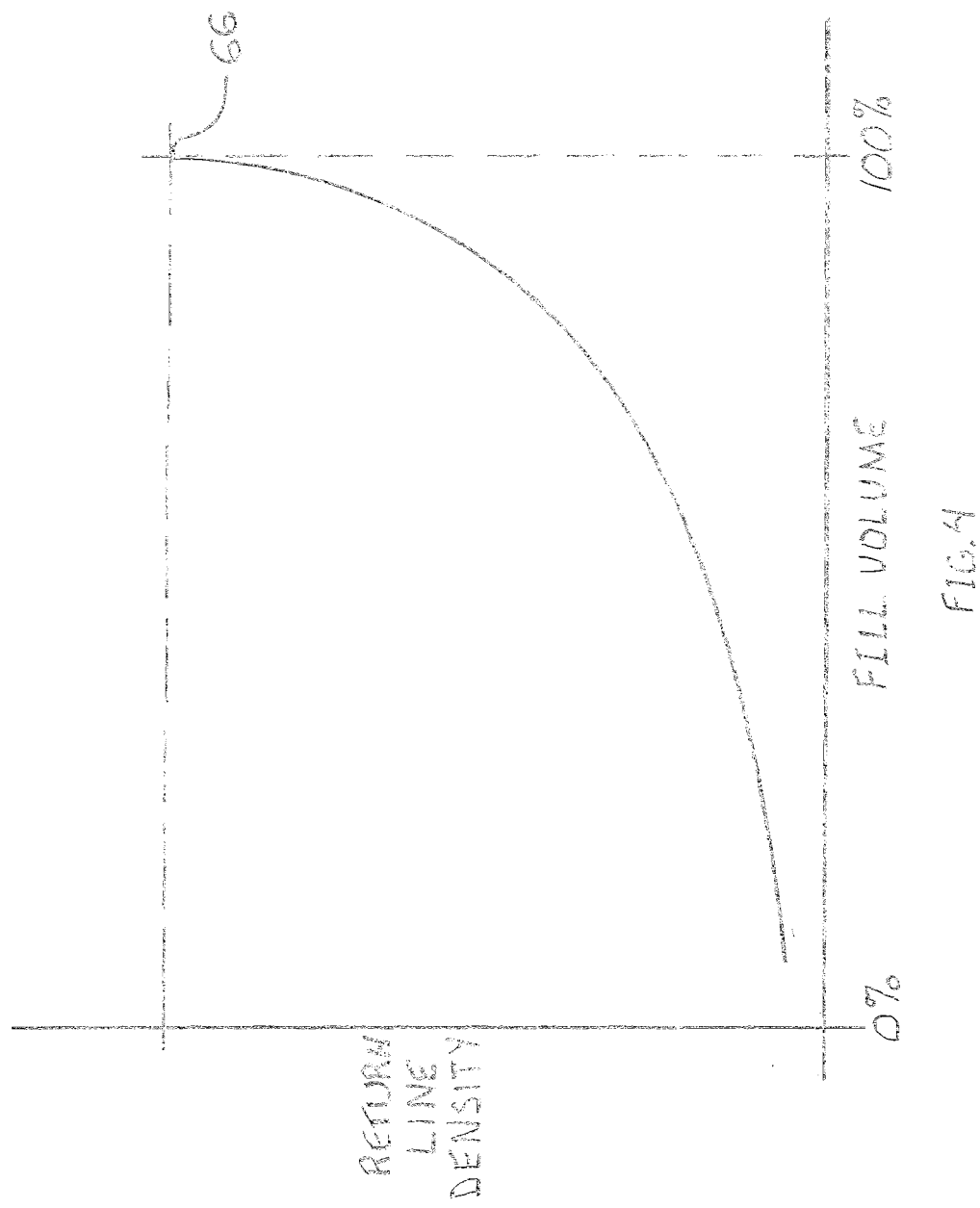
FIG. 4 is a graph of the density of the return line vs the fill level of the trailer.

As is shown in FIG. 1, the trailer 16 is moved into position and the supply line 50 and return line 58 are attached. The trailer 16 begins as an empty container. At that point, the blower 48 is turned on, thereby circulating air through the supply line 50, the return line 58, the introduction chamber 30, and the pipe 42. The trailer 16 begins to fills up with dust 12 from the dust collector 14. As the trailer 16 continues to fill with dust 12, there is less room for the dust 12 to fall out of the dust/air mixture 38. At that point, more dust 12 begins to travel through the return line 58. A graph of the density of dust in the return air 54 based on the fill level of the trailer 16 is shown in FIG. 4. A trip point 66 is set by either the sensor 60 or the control system 64 that either indicates to the user that the trailer 16 is full or it directly controls the blower and rotary feeder 20.

While the blower 48 as shown in FIGS. 1 and 5 is located between the introduction chamber 30 and the supply line 50, it is contemplated that the blower 48 is located in the return line 58 ahead of the introduction chamber 30. In this event, the dust 12 would mix with the return air 54 to form the dust/air mixture 38 under positive pressure. This arrangement would be especially helpful if the dust 12 were abrasive or otherwise harmful to the blower 48.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. An indicator system affixed to a trailer blow-in system with a dust collector and adapted to remotely sense a level of dust in a removable storage container having a storage inlet and a storage outlet, said dust collector having a feeder having a feeder inlet adapted to receive dust from said dust collector and a feeder outlet adapted to dispense a controlled amount of said dust from said dust collector, said system comprising:

an introduction chamber having a dust inlet adapted to receive said controlled amount of said dust from said feeder outlet, said introduction chamber having a return air inlet in fluid communication with an introduction chamber outlet, said dust inlet located between said return air inlet and said introduction chamber outlet, when air passes from said return air inlet to said introduction chamber outlet, said dust located in said introduction chamber becomes entrained within said air, said return air inlet in fluid communication with a return line;

a blower adapted to move said air from said return air inlet to said introduction chamber outlet;

said return line in fluid communication with said storage outlet of said removable storage container and in fluid communication with said return air inlet of said introduction chamber, said storage inlet of said removable storage container in fluid communication with said outlet of said introduction chamber;

a density sensor located in said return line and adapted to sense an amount of said dust in said air, said density sensor having a signal indicating a dense state representing a relatively large amount of said dust in said air and a light state representing a relatively small amount of said dust in said air; and an indicator in electrical communication with said density sensor.

2. The indicator system of claim 1, and a control system in electrical communication with said density sensor, said blower and said feeder, said control system receiving said signal from said density sensor and controlling said blower and said feeder.

3. The indicator system of claim 1, said blower, said introduction chamber, said return line, and said removable storage container forming a continuous loop of fluid, said blower adapted to circulate said continuous loop of fluid.

4. The indicator system of claim 3, said density sensor enabling an externally observable signal when said removable storage container is substantially full.

5. The indicator system of claim 4, said blower adapted to generate relatively negative pressure at a blower inlet and relatively positive pressure at a blower outlet.

6. The indicator system of claim 5, said blower located between said outlet of said introduction chamber and said inlet of said removable storage container.

7. An indicator system for use with a dust collector with a trailer blow-in system and remotely sensing a level of dust in a removable storage container having a storage inlet and a storage outlet, said dust collector having a feeder having a feeder inlet adapted to receive dust from said dust collector and a feeder outlet adapted to dispense a controlled amount of said dust from said dust collector, said system comprising:
- an introduction chamber having a dust inlet adapted to receive said controlled amount of said dust from said feeder outlet, said introduction chamber having a return air inlet in fluid communication with an introduction chamber outlet, said dust inlet located between said return air inlet and said introduction chamber outlet, when air passes from said return air inlet to said introduction chamber outlet, said dust located in said introduction chamber becomes entrained within said air, said return air inlet in fluid communication with a return line;
- a blower adapted to move said air from said return air inlet to said introduction chamber outlet;
- said return line in fluid communication with said storage outlet of said removable storage container and in fluid communication with said return air inlet of said introduction chamber, said storage inlet of said removable storage container in fluid communication with said outlet of said introduction chamber;
- said outlet of said blower in fluid communication with said inlet of said removable storage container when said storage container is affixed to said blow-in system;
- a density sensor located in said return line and adapted to sense an amount of said dust in said air, said density sensor having a signal indicating a dense state representing a relatively large amount of said dust in said air and a light state representing a relatively small amount of said dust in said air; and
- an indicator in electrical communication with said density sensor.

8. The indicator system of claim 7, said blower, said introduction chamber, said return line, and said removable storage container forming a continuous loop of air, said blower circulating said air through said continuous loop.

9. The indicator system of claim 7, and a control system in electrical communication with said density sensor, said blower and said feeder, said control system adapted for controlling said feeder and said blower.

10. The indicator system of claim 7, said density sensor enabling an externally observable signal when said removable storage container is substantially full.

11. The indicator system of claim 10, said blower located between said outlet of said introduction chamber and said inlet of said removable storage container.

12. An indicator system for use with a dust collector and remotely sensing a level of dust in a removable storage container having a storage inlet and a storage outlet, said dust collector having a feeder having a feeder inlet adapted to receive dust from said dust collector and a feeder outlet adapted to dispense a controlled amount of said dust; said feeder having an auger disposed between said feeder inlet and said feeder outlet, said auger moveable to dispense said controlled amount through said feeder outlet, said system comprising:
- an introduction chamber having a dust inlet adapted to receive said controlled amount of said dust from said feeder inlet, said introduction chamber having a return air inlet in fluid communication with an outlet, said dust inlet located between said inlet and said outlet, when fluid passes from said inlet to said outlet, said dust located in said introduction chamber becomes entrained with said fluid, said inlet in fluid communication with a return line;
- a blower located intermediate said introduction chamber and said removable storage container, said blower adapted to draw said fluid from an inlet having negative pressure to an outlet having positive pressure;
- said return line in fluid communication with said outlet of said storage container and in fluid communication with said return air inlet of said introduction chamber;
- said return line, said introduction chamber, said blower and said removable container forming a continuous loop of fluid;
- a density sensor located in said continuous loop of fluid and adapted to sense an amount of said dust in said fluid, said density sensor having a signal changeable between a dense state representing a relatively high density of said dust in said fluid and a light state representing a relatively low density of said dust in said fluid; and
- an indicator in electrical communication with said density sensor and receiving said signal from said density sensor.

13. The indicator system of claim 12, and a control system in electrical communication with said density sensor, said blower and said feeder, said control system adapted for controlling said feeder and said blower.

14. The indicator system of claim 12, said density sensor enabling an externally observable signal when said removable storage container is substantially full.

15. The indicator system of claim 14, said blower located between said outlet of said introduction chamber and said inlet of said removable storage container.

* * * * *